No. 875,055. PATENTED DEC. 31, 1907.
C. ELLIS & K. P. McELROY.
PROCESS OF MAKING FORMATES.
APPLICATION FILED JUNE 11, 1906.
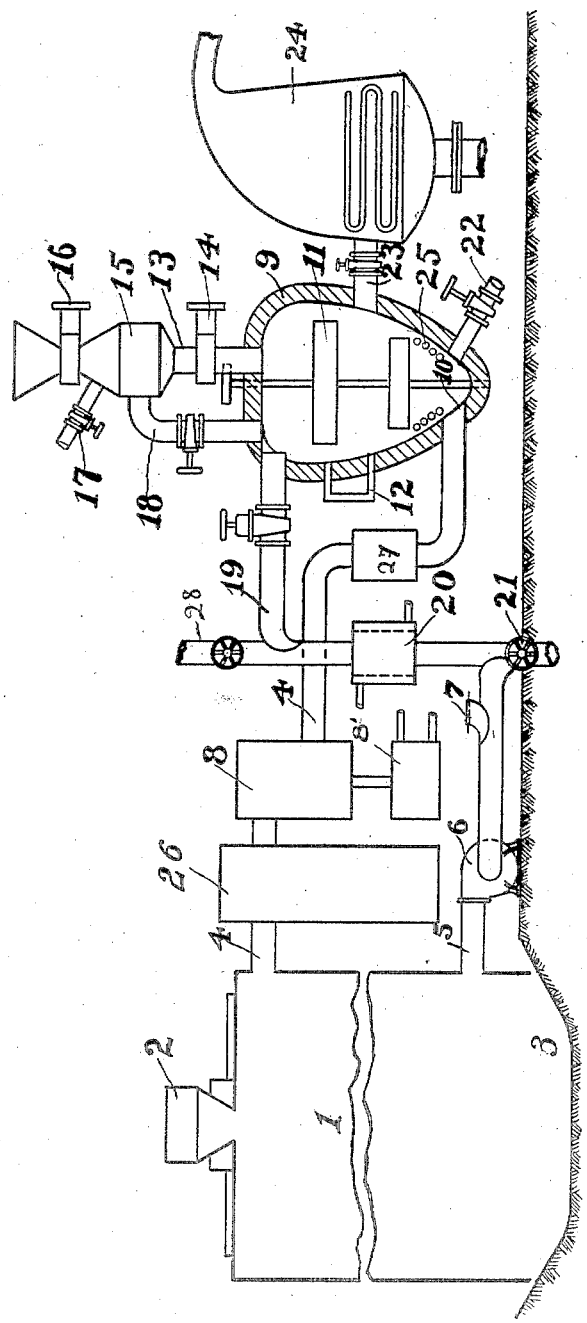
WITNESSES:
INVENTORS
Carleton Ellis and
K. P. McElroy.
BY
Marble & McElroy
ATTORNEYS

UNITED STATES PATENT OFFICE.

CARLETON ELLIS, OF WHITE PLAINS, NEW YORK, AND KARL P. McELROY, OF WASHINGTON, DISTRICT OF COLUMBIA.

PROCESS OF MAKING FORMATES.

No. 875,055.　　　　　　Specification of Letters Patent.　　　　　　Patented Dec. 31, 1907.

Application filed June 11, 1906. Serial No. 321,129.

*To all whom it may concern:*

Be it known that we, CARLETON ELLIS and KARL P. McELROY, citizens of the United States, residing, respectively, in White Plains, county of Westchester, and State of New York, and in Washington, District of Columbia, have invented certain new and useful Improvements in Processes of Making Formates; and we hereby declare the following to be a full, clear, and exact description of the same.

This invention relates to processes of making formates and consists in a method of synthesizing formates by the reaction of carbon monoxid upon substantially insoluble metallic carbonates, and similar substantially insoluble basic bodies, under certain novel conditions; all as more fully hereinafter set forth, matters of novelty being particularly pointed out in the appended claims.

Formic acid, HCOOH, has the same empirical composition as a molecule of water and a molecule of carbon monoxid taken together, and it has long been known that in the presence of soluble alkalies, the monoxid and water would react together to form formates. The reaction however is slow, the yield not good and the formates of the only bases hitherto deemed well adapted, potassium and sodium, are not particularly desirable commercially since it is difficult to produce formic acid from them. The slowness and poor yield are partly due to the fact that formates are not very stable in alkaline solutions.

It is the object of the present invention to produce metallic formates, and particularly those of the alkaline earth metals, by a simple, cheap and ready method enabling the production of large yields from cheap raw materials and delivering formates of more commercial value. For this purpose there is preferably used as a raw material a metallic carbonate insoluble in water, and particularly one of an alkaline earth metal; preferably a precipitated carbonate. Being insoluble in water, these bodies do not have the stated detrimental effect upon the produced formate, and a soluble of such produced formate can be withdrawn from time to time from the excess of base without danger of contamination by dissolved base. In the case of a precipitated carbonate, it is of an extreme fineness, such as could only be produced from the natural carbonates by laborious grinding. Such natural carbonates may however be used, though with less advantage. In the case of calcium carbonate, the fine powder produced by air slaking lime may also be used. Fine division is very advantageous, although not absolutely necessary, as facilitating chemical reaction and as permitting suspension of the material in water to secure intimate contact of the three reacting bodies, monoxid, water and base. The carbonate used will of course depend on the formate to be made, but ordinarily those of calcium, barium and strontium are to be preferred since these bases yield insoluble sulfates and oxalates and are therefore suitable for making formic acid. Lead carbonate is also suitable for the same reason. Lead oxid, zinc oxid or any other insoluble metallic oxid may be used in lieu of the carbonate. Calcium carbonate is however regarded as particularly suitable because of the low molecular weight of calcium and because the precipitated carbonate is readily available as a waste product in many arts, as for instance in the causticizing of soda, in the purification of water, etc. Magnesium oxid and carbonate are also suitable.

To avoid production of an impure formate solution which cannot be drawn off substantially pure by simple settling, the basic body employed should be one which is substantially insoluble in water; that is one which is not soluble in water to the extent of more than a few hundredths per cent., and, preferably, not to the extent of more than a few thousandths per cent., as in the case of the carbonates of the alkaline earths or zinc oxid.

As a source of carbon monoxid, producer gas is cheap and suitable. Preferably the gas is made by feeding the producer with a draft current containing carbon dioxid as an endothermic constituent. Producer gas made with steam is much less suitable since it contains hydrogen, has relatively less carbon monoxid and generally contains an excessive amount of carbon dioxid. Producer gas made with a draft current containing waste gases from a lime kiln, or similar source of carbon dioxid, is especially well adapted since it is richer in carbon monoxid than producer gas made either with a straight air draft or with a draft containing ordinary products of combustion. However, for reasons later appearing, it is preferred to prepare the producer gas with waste gases from the formate manufacture.

Where a white formate is desirable, the gas should be washed before use unless it be made from a producer charge of coke or charcoal.

In performing the formate synthesis, the carbonate is suspended in water in a vessel capable of resisting heavy pressure, and carbon monoxid, or producer gas, introduced under a pressure of several atmospheres. The temperature in the vessel should be high. Temperature and pressure are in some degree reciprocal or interchangeable, it being permissible to lower the temperature somewhat if the pressure be heightened and vice versa. A temperature of 275° C. and two or three atmospheres, or higher, may be employed. The gas should be blown in at the bottom of the digester to keep the carbonate in suspension and insure good contact, and the carbon dioxid, together with the nitrogen of the producer gas, liberated at the top of the vessel through a suitable valved conduit. As it is desirable to work rapidly and to keep an excess of carbon monoxid present at all times, there is commonly more or less of this substance in the waste gases. To economize it therefore, the waste gases may be usefully employed as a component of the draft current of the producer. Under the ordinary laws of mass action, governing such reactions as this, it is desirable to keep an excess of the reacting bodies present at all times and avoid an excess of the product of reaction. For this reason, the producer gas is ordinarily blown through faster than it is absorbed and since the unabsorbed portion goes back to the producer, in this embodiment of this invention this can be very advantageously done, keeping a high partial pressure of carbon monoxid in the formate vessel at all times without waste. Further, an excess of insoluble carbonate is also desirable. Therefore, the operation is interrupted from time to time, the excess of carbonate allowed to settle out, and the produced formate removed by drawing off a portion of the solution, which is replaced by fresh water. Thus operating it is obvious that there is at all times an excess of the reacting bodies while any large excess of the product of reaction, the formate, is avoided. These conditions contribute materially to the speed and practicality of the process.

In blowing air through a deep bed of ignited fuel in a gas producer, the oxygen is nearly all converted into carbon monoxid, and the gas produced consists essentially of a mixture of monoxid and nitrogen, though it always contains a small amount of carbon dioxid; the proportion demanded by the laws of partial pressures under the temperatures and other conditions existing in the producer. But since the formation of monoxid is an exothermic reaction, the heat in the producer tends to rise to a point which is inconvenient for many reasons as tending to clinker ash, causing the issuing gas to be unduly hot, raising its tenor in carbon dioxid, etc. For this reason it is desirable to balance the heat evolving properties of air by constituting the draft current partly of carbon dioxid, or gases containing the same, since the reduction of the dioxid by carbon absorbs heat, thereby maintaining the heat of the producer at any desired point. This carbon dioxid may very advantageously be that evolved in the formate reaction, thereby incidentally recovering carbon monoxid which has gone through the formate digester unchanged. Where work in the digester is pushed and much carbon monoxid passes through unchanged, in order to avoid an explosive mixture the air for the draft current and the digester gases may be introduced into the producer through separate twyers, located however in close proximity so that exothermic and endothermic reactions may balance each other in the same layers of producer fuel.

In the preferred embodiment of this invention, the waste gases from the digester are used as the endothermic agent for the sake of recovering carbon monoxid, since with this gas so utilized a rapid circulation can be maintained through the digester without waste. The proportions of these waste gases and of air in the draft current are preferably so balanced that the fuel in the producer is maintained at an efficient gasifying temperature.

Before use the waste gases from the digester are preferably cooled or refrigerated or otherwise treated to free them from water vapor for the reason that steam in the producer forms hydrogen and this is, as stated, undesirable in the gas furnished the digester. Moisture in the draft current is also apt to result in undesirable amounts of carbon dioxid in the gas.

In the accompanying, more or less diagrammatic, drawing is shown one form of apparatus of the many adapted to perform the process of the present invention.

In this illustration: 1 is a gas producer provided with the usual fuel inlet 2 and water seal 3.

4 is a gas conduit and 5 the draft inlet pipe. This pipe is provided with fan 6 on the suction side of which is a valved air inlet 7. The gas conduit is provided with a scrubber, 26 and an ordinary high pressure pump, 8, provided with the usual steam cylinder 8ª, taking gas from the conduit and delivering it through reheater 27 into the base of the digester 9 at 10 under high pressure. In the digester the suspension of the carbonate, or the formation of a thin magma is effected by the incoming gas, but stirrer 11, rotated by pulley 11ª may be used to aid in this. The level of the mixture is observed by means of ordinary gage glass 12. Water and base are introduced through pipe 13 provided with gate 14, from hopper 15, provided with an upper gate 16, a venting valve 17, and a valved equalizing pipe 18 establishing communication with the digester and equalizing pressures when feed is necessary. The waste gases from the digester leave through valved pipe 19 provided with a cooling jacket 20 whereby water may be condensed out and removed, outlet 21 being provided for this purpose in a dip of the pipe. Where a portion of the gas of the producer is used for other purposes, all the waste gases from the digester may be returned thereto. If used only for the formate digester, the excess of waste gases above that needed as an endothermic agent in the producer may depart through valved pipe 28.

At the lowermost portion of the digester is a sand-gate 22 for removing sand, etc., entering with the carbonate and accumulating. At a point well above the bottom of the digester is a valved liquid outlet pipe 23 communicating with a vacuum pan or other form of evaporator, 24.

Steam pipes 25 provide the necessary heat in the digester.

In operation, a mixture of carbonate, or other insoluble basic body, and water is introduced into the digester till the desired liquid level is attained and gas from the producer is forced in under high pressure, bubbling through the magma of water and base and converting it into a solution of formate of the base employed. The carbonic acid displaced, when a carbonate is used, the nitrogen of the gas and whatever carbon monoxid has not been absorbed leave the digestor as waste gases. These waste gases are cooled and all or a fraction used to admix with the air employed for the draft current of the producer. As the water in the digester becomes charged with formate, the admission of gas is stopped from time to time whereby the liquid in the digester becomes quiet and the suspended insoluble base settles to the bottom leaving a comparatively clear liquid above. When calcium formate is being produced, the solution may be drawn off at about 5 to 6 per cent. formate content. If a stirring mechanism is also used it is of course stopped during this settling period. The clear liquid is drawn off, sent to the evaporator, fresh water and base added and the introduction of gas resumed. The speed of gas circulation will depend somewhat on the particular carbonate employed and the partial pressure of carbon monoxid which it is desirable to maintain in the formate vessel, but ordinarily the gas may be sent through it with such speed as to result in about 50 per cent. absorption of the carbon monoxid.

What we claim is:

1. In the manufacture of formates, the process which consists in suspending in water a metallic basic body substantially insoluble in water, treating said suspended body with carbon monoxid under high pressure and at a high temperature till a formate is formed in substantial amount, allowing the excess of basic body to settle out of the clear solution so formed, removing a portion of the solution, replacing with water and repeating the operation.

2. In the manufacture of formates, the process which consists in treating an insoluble carbonate suspended in water with carbon monoxid at a high temperature and under high pressure.

3. In the manufacture of formates, the process which consists in treating an insoluble metallic carbonate suspended in water of high temperature with carbon monoxid under pressure.

4. In the manufacture of formates, the process which consists in treating an insoluble metallic carbonate suspended in water of high temperature with producer gas under pressure.

5. In the manufacture of calcium formate, the process which consists in treating calcium carbonate suspended in water with carbon monoxid at a high temperature and under high pressure.

6. In the manufacture of calcium formate, the process which consists in treating calcium carbonate suspended in water of high temperature with carbon monoxid under pressure.

7. In the manufacture of calcium formate, the process which consists in treating calcium carbonate suspended in water of high temperature with producer gas, under high pressure.

8. In the manufacture of calcium formate, the process which consists in treating calcium carbonate suspended in water of high temperature with producer gas under pressure.

9. The process of manufacturing formates which consists in treating a basic body suspended in water of high temperature with a current of producer gas under pressure at a rate faster than the basic body will absorb carbon monoxid therefrom, removing the excess and waste gases, admixing the same with air, transmitting the same through a deep bed of ignited fuel and returning the resultant gas into contact with aforesaid basic body.

10. The process of manufacturing formates which consists in treating an insoluble metallic carbonate suspended in water of high temperature with producer gas under pressure, removing the excess and waste gases, admixing the same with air, transmitting the same through a deep bed of ignited fuel and returning the resultant gas into contact with aforesaid carbonate.

11. The process of manufacturing calcium formate which consists in treating calcium carbonate suspended in water of high temperature with producer gas under pressure, removing the excess and waste gases, admixing the same with air, transmitting the mixture through a deep bed of ignited fuel and returning the resultant gas into contact with aforesaid calcium carbonate.

12. The process of producing formates which consists in forcing carbon monoxid through a magma of water and a basic body substantially insoluble in water, said magma being maintained under high temperature and pressure, ceasing the introduction of the gas when the water becomes charged with formate and before all the base is converted, allowing the base in excess to settle and withdrawing a portion of the clear solution.

13. The process of producing calcium formate which consists in forcing carbon monoxid through a magma of water and calcium carbonate maintained under high temperature and pressure, ceasing the introduction of the gas when the water becomes charged with formate and before all the calcium carbonate is converted, allowing the carbonate in excess to settle out and withdrawing a portion of the clear liquid.

14. The process of producing calcium formate which consists in forcing carbon monoxid through a magma of water and precipitated calcium carbonate maintained under high temperature and pressure, ceasing the introduction of the gas when the water becomes charged with formate and before all the calcium carbonate is converted, allowing the carbonate in excess to settle out and withdrawing a portion of the clear liquid.

In testimony whereof, we affix our signatures in the presence of witnesses.

CARLETON ELLIS.
K. P. McELROY.

Witnesses for Ellis:
  T. H. FAIR,
  FLETCHER P. SCOFIELD.

Witnesses for McElroy:
  BLANCHE L. CHADWELL,
  A. M. HOUGHTON.